US011041339B2

(12) United States Patent
Miller et al.

(10) Patent No.: US 11,041,339 B2
(45) Date of Patent: Jun. 22, 2021

(54) PORTABLE WIND AND SUN SCREEN

(71) Applicants: Robert Edward Miller, Lakeside, CA (US); Michael Ray Blair, San Diego, CA (US)

(72) Inventors: Robert Edward Miller, Lakeside, CA (US); Michael Ray Blair, San Diego, CA (US)

(*) Notice: Subject to any disclaimer, the term of this patent is extended or adjusted under 35 U.S.C. 154(b) by 404 days.

(21) Appl. No.: 15/876,049

(22) Filed: Jan. 19, 2018

(65) Prior Publication Data

US 2019/0226275 A1 Jul. 25, 2019

(51) Int. Cl.
| | | |
|---|---|---|
| *E06B 9/68* | (2006.01) | |
| *E06B 9/66* | (2006.01) | |
| *E06B 9/42* | (2006.01) | |
| *H02S 40/32* | (2014.01) | |
| *H02S 40/38* | (2014.01) | |
| *H02S 30/20* | (2014.01) | |
| *E04H 15/10* | (2006.01) | |
| *E04H 15/32* | (2006.01) | |
| *E06B 9/40* | (2006.01) | |

(52) U.S. Cl.
CPC .............. *E06B 9/68* (2013.01); *E04H 15/10* (2013.01); *E04H 15/32* (2013.01); *E06B 9/42* (2013.01); *E06B 9/66* (2013.01); *H02S 30/20* (2014.12); *H02S 40/32* (2014.12); *H02S 40/38* (2014.12); *E06B 2009/405* (2013.01)

(58) Field of Classification Search
CPC ..... E06B 9/42; E06B 9/66; E06B 9/68; E06B 2009/405; E04H 15/32; E04H 15/10; G03B 21/58

USPC ............................................. 40/518
See application file for complete search history.

(56) References Cited

U.S. PATENT DOCUMENTS

| | | | | | |
|---|---|---|---|---|---|
| 2,790,452 | A | * | 4/1957 | Dusek | E04H 15/04 135/120.3 |
| 2,981,583 | A | * | 4/1961 | Eisenberg | A47F 3/142 312/140.4 |
| 3,233,618 | A | * | 2/1966 | Ferrier | A47B 37/04 108/42 |
| 3,744,500 | A | * | 7/1973 | Briggs | E04H 15/32 135/140 |
| 5,216,834 | A | * | 6/1993 | Crowley | A01G 9/1438 47/17 |
| 5,467,266 | A | * | 11/1995 | Jacobs | B60J 1/2016 160/1 |
| 5,555,681 | A | * | 9/1996 | Cawthon | A01G 9/16 52/63 |
| 6,244,286 | B1 | * | 6/2001 | Russo | A47C 1/16 135/124 |
| 6,397,869 | B1 | * | 6/2002 | Jennings | E04H 15/14 135/120.1 |
| 6,991,019 | B2 | * | 1/2006 | Chang | E06B 9/42 160/24 |

(Continued)

*Primary Examiner* — Johnnie A. Shablack
*Assistant Examiner* — Abe Massad
(74) *Attorney, Agent, or Firm* — MU Patents (57) ABSTRACT

In an embodiment, a screen apparatus is provided. The screen apparatus is comprised of a base and a screen case. Disposed within the base are a power inverter, one or more batteries, a fuse panel, and a first screen roller. Disposed within the screen case is a second screen roller. The screen case is further provided with a means for hanging the screen case from a stable structure. The screen case is pulled away from the base to expose a screen.

14 Claims, 12 Drawing Sheets

(56) References Cited

U.S. PATENT DOCUMENTS

| | | | | |
|---|---|---|---|---|
| 7,511,451 B2* | 3/2009 | Pierce | ............... | H01M 2/10 |
| | | | | 312/351.11 |
| 8,069,871 B2* | 12/2011 | Schneider | ............... | E04H 15/02 |
| | | | | 135/96 |
| 8,205,657 B2* | 6/2012 | Bohlen | ............... | E06B 9/58 |
| | | | | 160/245 |
| 8,469,077 B1* | 6/2013 | Allard | ............... | E04F 10/0603 |
| | | | | 160/24 |
| 8,944,132 B1* | 2/2015 | Floyd | ............... | A47G 5/02 |
| | | | | 160/23.1 |
| 9,388,600 B2* | 7/2016 | Leathers | ............... | A47B 97/00 |
| 2002/0060510 A1* | 5/2002 | Choi | ............... | A47B 37/04 |
| | | | | 312/6 |
| 2008/0211361 A1* | 9/2008 | Boxenbaum | ............... | A47B 51/00 |
| | | | | 312/196 |
| 2016/0338457 A1* | 11/2016 | Gharabegian | ............... | A45B 25/165 |
| 2017/0318923 A1* | 11/2017 | Gharabegian | ............... | E04H 15/28 |
| 2017/0321481 A1* | 11/2017 | Ashkanmehr | ............... | E06B 9/70 |
| 2018/0034015 A1* | 2/2018 | Krantz | ............... | H01G 9/08 |
| 2018/0083452 A1* | 3/2018 | Estes | ............... | H04R 1/028 |

* cited by examiner

PORTABLE WIND AND SUN SCREEN

BACKGROUND OF THE INVENTION

Wind can be a nuisance during picnics and outdoor gatherings where food is available. Light weight items such as paper plates and napkins can be blown off the table, causing them to spill or fall to the ground.

Additionally, sunlight can be a problem during outdoor events. The sunlight can cause cold items to warm up and damage items which should not be in direct sunlight. Furthermore, direct sunlight can be uncomfortable and cause sunburns and skin damage.

While canopies may provide coverage from the sun, they provide little protection from the wind. Furthermore, throughout the course of the day, the angle of the sun changes along with the position of the shade provided by the canopy. This means moving tables, chairs, and ice chests around to keep them in the shade of the canopy.

Based on the foregoing, there is a need in the art for a means to easily provide shade and wind protection to designated areas during outdoor gatherings.

SUMMARY OF THE INVENTION

In an embodiment, a screen apparatus is provided. In the embodiment, the screen apparatus is comprised of a base. Disposed within the base are a power inverter, one or more batteries, a fuse panel, and a first screen roller.

The screen apparatus is further provided with a screen case. Disposed within the screen case is a second screen roller. The screen case is further provided with a means for hanging the screen case from a stable structure.

In the embodiment, the screen case is pulled away from the base to expose a screen.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-12B, wherein like reference numerals refer to like elements.

Figure 1:
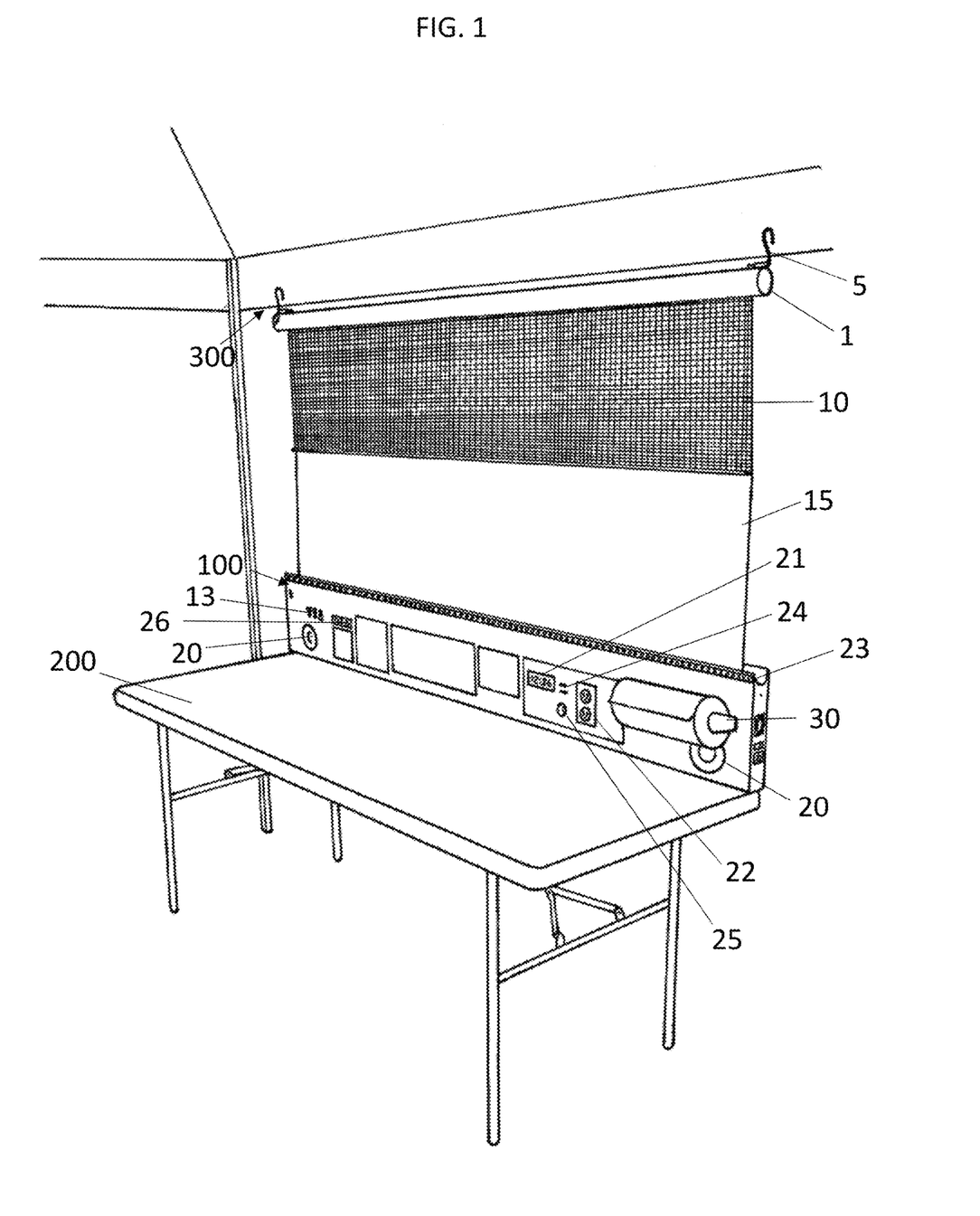
FIG. 1 is a perspective view of the portable wind and sun screen, according to an embodiment of the present invention.
Figure 2:
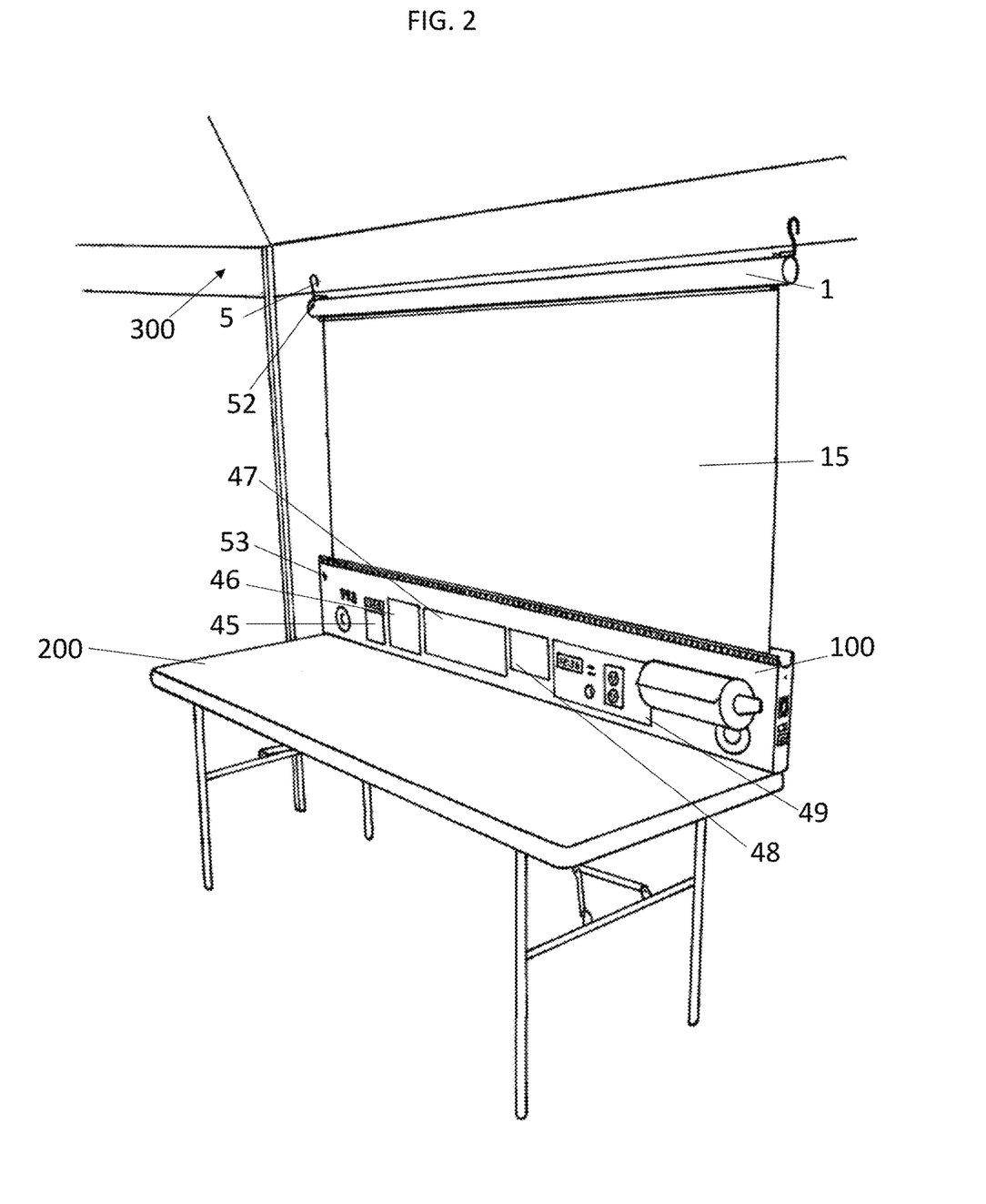
FIG. 2 is a perspective view of the portable wind and sun screen, according to an embodiment of the present invention.
Figure 3:
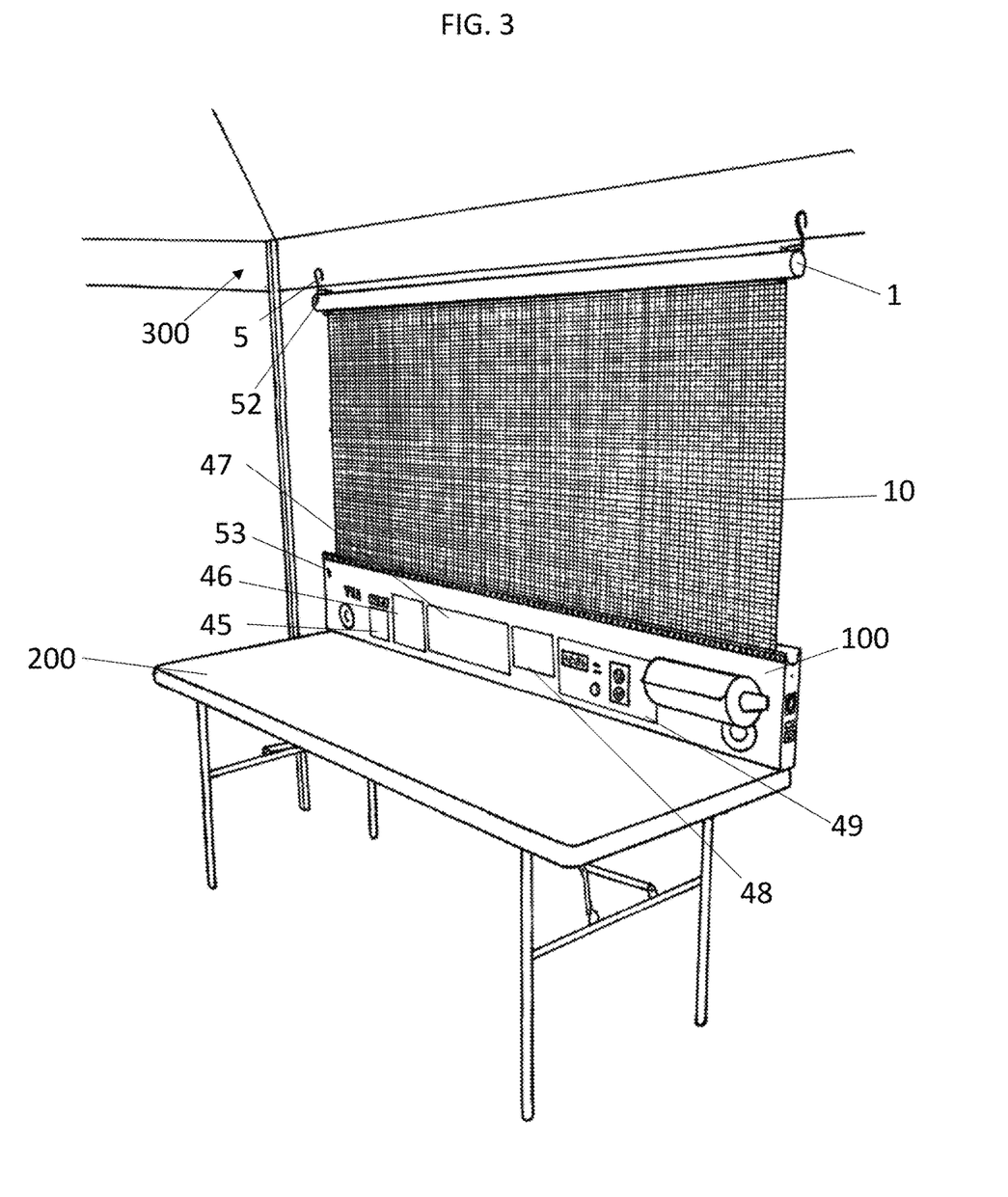
FIG. 3 is a perspective view of the portable wind and sun screen, according to an embodiment of the present invention.

In reference to FIGS. 1-3, an embodiment of the present invention is shown as a portable wind and sun screen with the base 100 attached to a table 200. In the embodiment, the screen case 1, is attached to an existing canopy 300 via hooks 5. In other embodiments, the screen case 1 may attached to a canopy via other means such as zip-ties, Velcro, rope, or other fastening devices deemed appropriate.

In the embodiment shown in FIG. 1, the portable wind and sun screen is positioned such both the see-thru screen 10 and blackout screen 15 are in use. In an embodiment, the see-thru screen 10 is comprised of a mesh which provides some shading and wind protection while users are able to see through to the other side. The blackout screen 15 is provided as an opaque screen to completely block light and wind from passing through to the other side.

With reference to FIG. 2, an embodiment of the present invention is shown, wherein the full length of the blackout screen 15 is in use, without the use of the see-thru screen 10. In an example embodiment, the blackout screen 15 is opaque, and can be used to provide shade or to provide a surface to receive a projected image. With reference to FIG. 3, an embodiment of the present invention is shown, wherein the full length of the see-thru screen 10 is in use, without the use of the blackout screen 15. In another embodiment, the portable wind and sun screen may be used without the use of a table, wherein the screen case 1 is attached to a canopy 300 and the base 100 rests on the ground.

In an embodiment, as shown in FIGS. 1-3 the base 100 is further provided with a plurality of built-in accessories. With reference to FIG. 1, the base includes a rechargeable internal power source provided to power electrical accessories integrated with the base. In an embodiment, integrated electrical accessories include speakers 20, a built-in clock 21, AC receptacles 22, light bar 23, usb ports 24, cigarette lighter 25, and battery gauge 26. In an embodiment, the base 100 is further provided with a paper towel holder 30. In an example embodiment, referring to FIGS. 2-3, the inverter is housed in an inverter compartment 49.

In an example embodiment, shown in FIG. 1, the base 100 is further provided with three power switches 13. In the embodiment, one switch is provided to activate power from the battery, one switch is provided to activate charge from the solar panel, and one switch is provided to power on the light bar 23. In an example embodiment, the battery is a sealed 12-volt recharchable battery with a minimum of 18-amp hours.

In an embodiment, as shown in FIGS. 2-3, the base 100 is further provided with one or more compartments 45, 46, 47, 48. In an example embodiment, a fuse panel 45 is provided to house the fuses for the electrical components, a battery compartment 46 is provided to house the batteries used to provided power to the electrical components, a storage compartment 47 is provided to house personal items, and a media player compartment 48 is provided to house a media player and contain an auxiliary connection to the speakers. In a further embodiment, the media player compartment 48 may also provide charging cables for media player devices.

In reference to FIGS. 4-7, an embodiment of the present invention is shown wherein the base 100 is secured on to a table 200 using clamps 400. In an embodiment, apertures 40 (shown in FIG. 5) are provided to receive the clamps 400. While being transported, shade screens are retracted and the screen case 1 resides in the cavity provided on the base 100.

Figure 4:
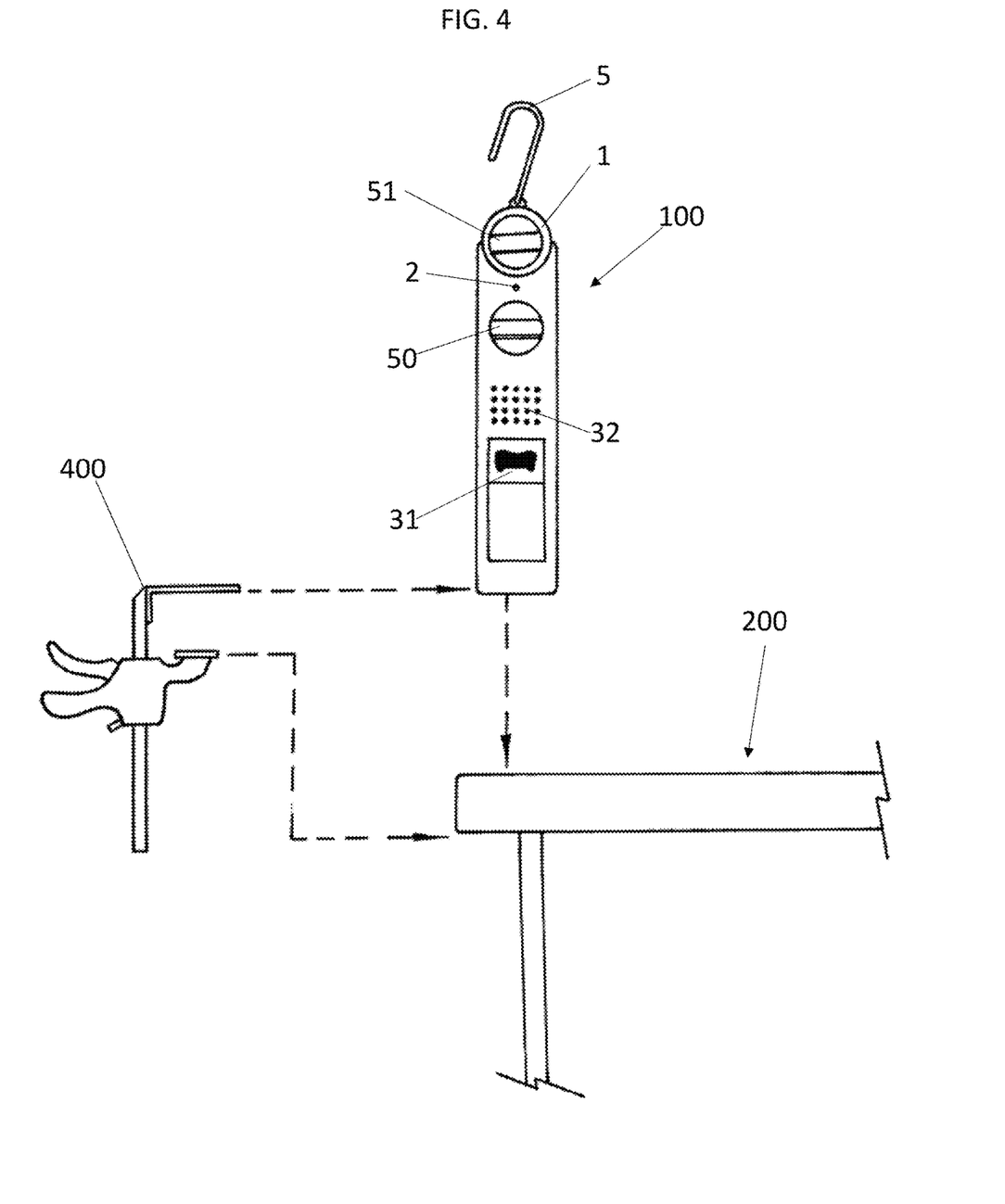
FIG. 4 is a side elevational view of the portable wind and sun screen, according to an embodiment of the present invention.
Figure 5:
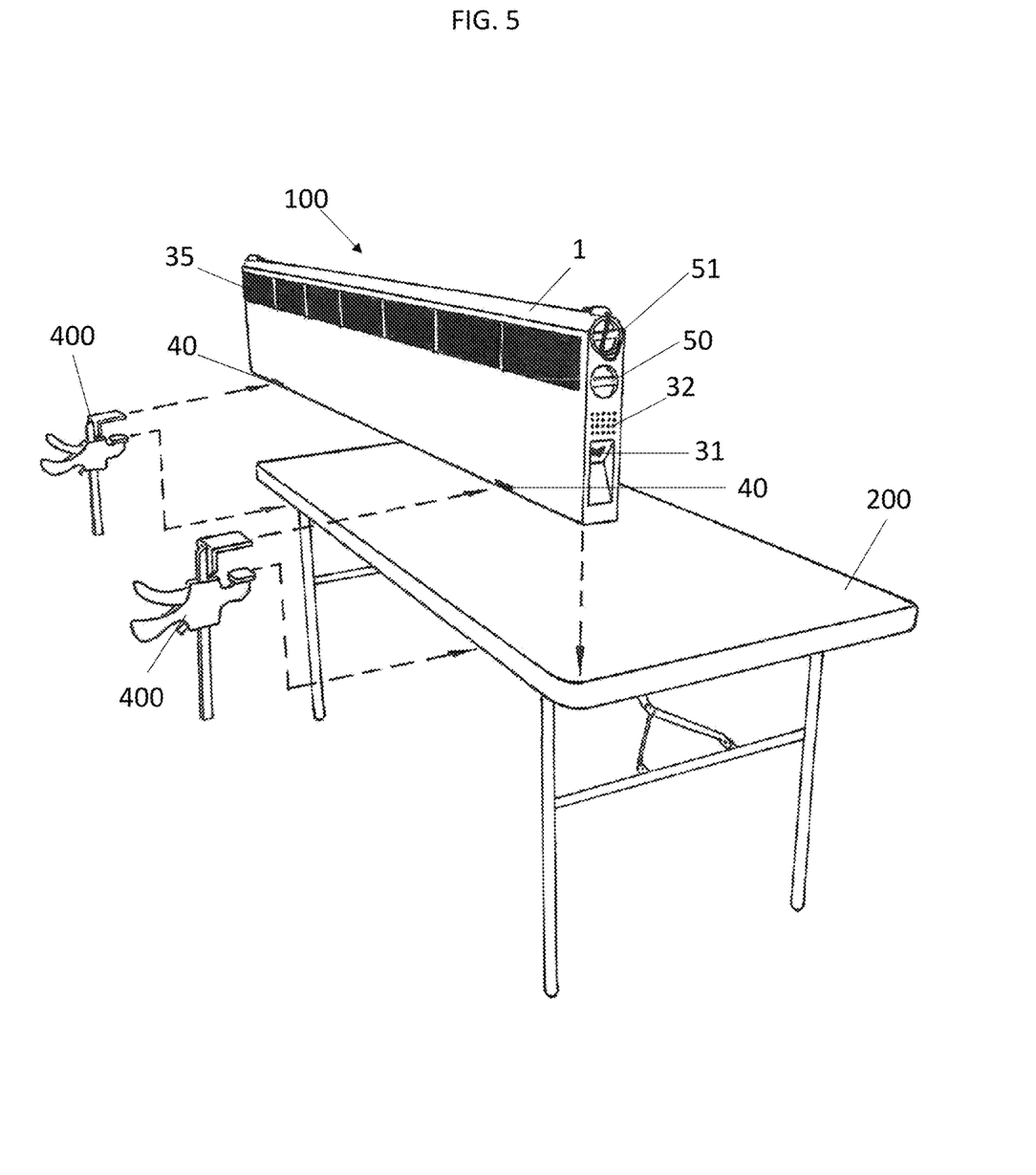
FIG. 5 is a perspective view of the portable wind and sun screen, according to an embodiment of the present invention.

In reference to FIGS. 4 and 5, an embodiment of the present invention is shown, wherein the lower screen adjuster 50 and upper screen adjuster 51 are shown. The lower screen adjuster 50 controls the screen roller disposed within the base 100. The upper screen adjuster 51 is provided to control a screen roller disposed within the screen case 1. In example embodiments, the screen rollers may be manual, spring-loaded, ratcheting, motorized, or any type screen roller deemed suitable. In an example embodiment, wherein spring-loaded screen rollers are used, the screen adjusters 50, 51, may be turned to adjust the tension of the springs.

In reference to FIGS. 2-3, in an example embodiment, upper thumb screw 52, and lower thumb screw 53, may be tightened to apply a brake to the lower screen roller and upper screen roller, respectively. In an embodiment, the thumbscrews 52, 53, tighten to engage a cog to stop the movement of the screen roller.

Figure 12A:
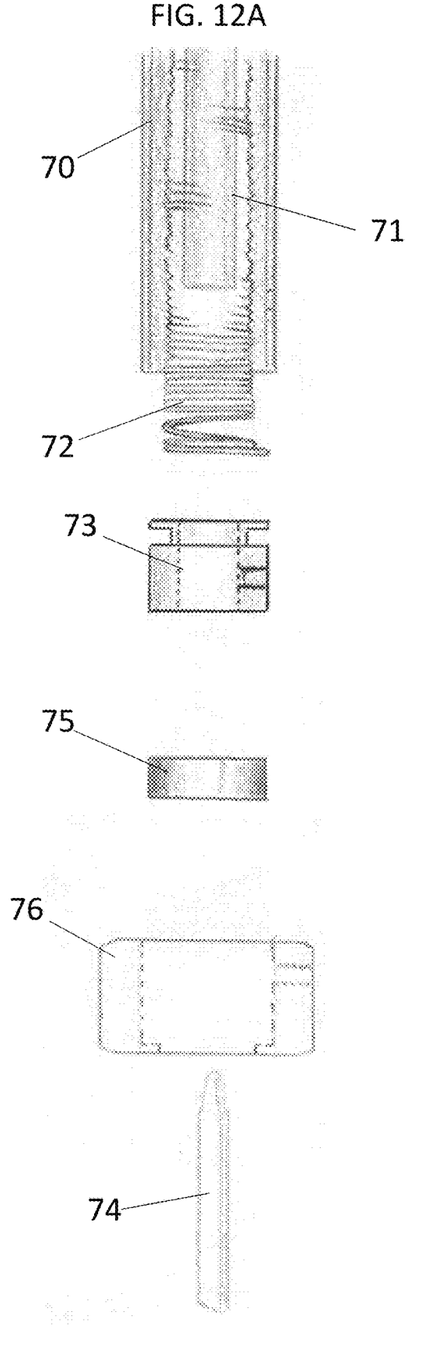
FIG. 12A is an exploded view of the screen roller component of the portable wind and sun screen, according to an embodiment of the present invention.
Figure 12B:
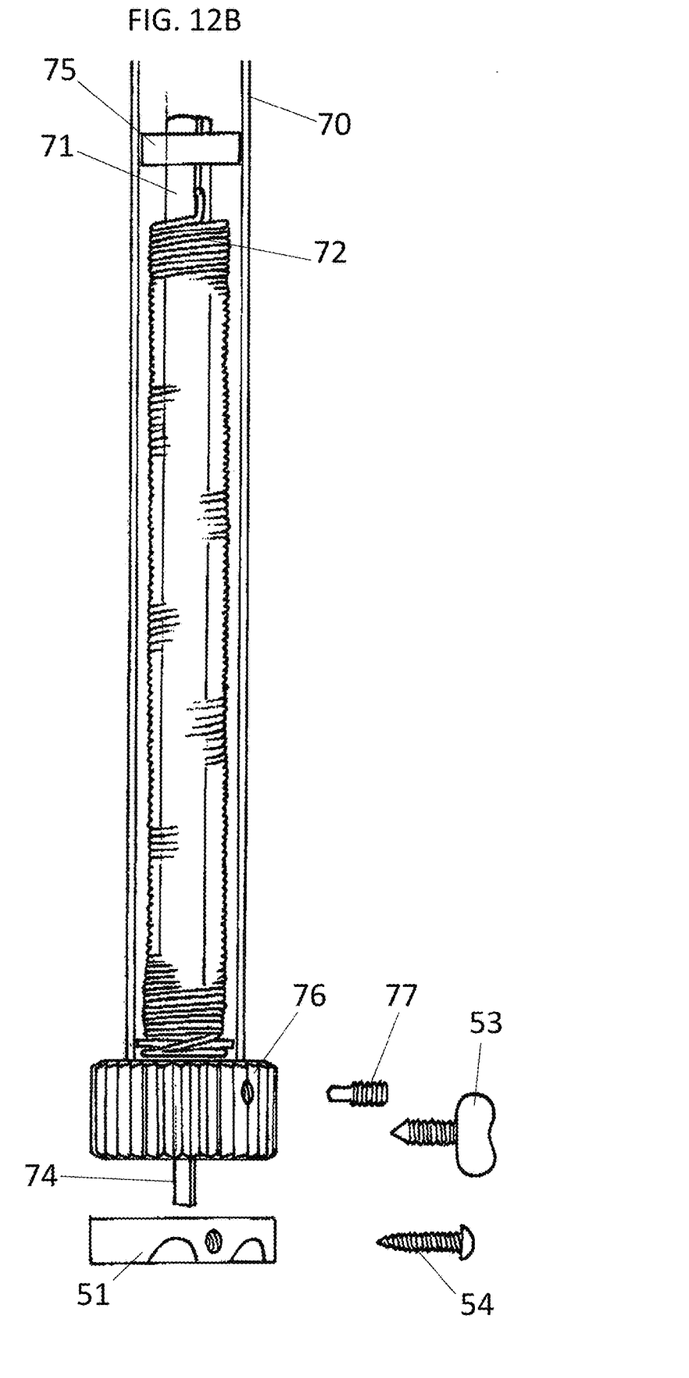
FIG. 12B is an assembled view of the screen roller component of the portable wind and sun screen, according to an embodiment of the present invention.

In reference to FIGS. 12A-12B, an embodiment of the spring-loaded screen roller system is shown. In the embodiment, the screen roller 70 is provided with a tension rod 71, housed within roller. One end of a spring 72 attaches to the inside end of the tension rod 71, accompanied by a bearing 75 to allow tension rod to spin freely inside screen roller. The other end of the spring 72 attaches to the spring fastener 73, and the tensioner rod 71 is allowed to spin freely inside the spring fastener 73. The tension rod 71 is positioned inside bearing 75 to spin freely inside the spring fastener and the screen roller end. The tension blade 74 is inserted and fixed into the end of tension rod 71. The spring fastener 73 is then fixed to the screen roller 70 and brake cog 76, using set screw 77. The brake cog, with the set screw, holds the complete unit together. The arrangement is provided, such that the screen roller 70 will spin about the tension rod 71 when tension is applied to the spring 72, via tension blade 74. In an embodiment, the tension blade is set within an aperture provided in the screen adjuster 51 and locked with blade screw 54. To adjust tension to the spring/tension rod, the user removes the blade screw 54 to manually turn the screen adjuster 51, and replaces the blade screw when the tension is to be set. The screen adjuster must be fixed with the blade screw to retain tension.

In an embodiment, the brake cog 76 is provided with multiple teeth about its perimeter (as shown in FIG. 12B). The teeth allow for a thumbscrew 53 to engage the cog to stop the movement of the screen roller.

Figure 6:
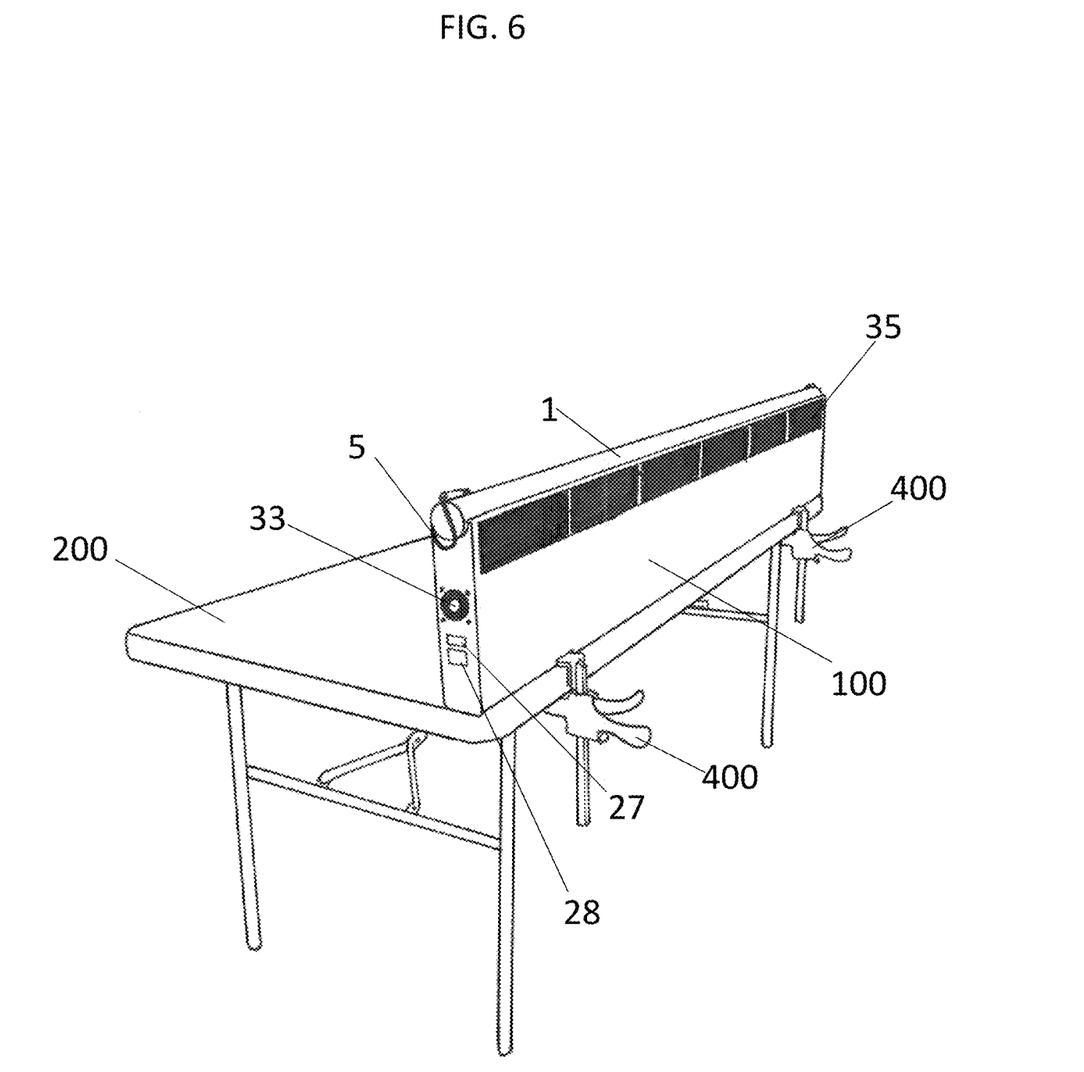
FIG. 6 is a perspective view of the portable wind and sun screen, according to an embodiment of the present invention.
Figure 7:
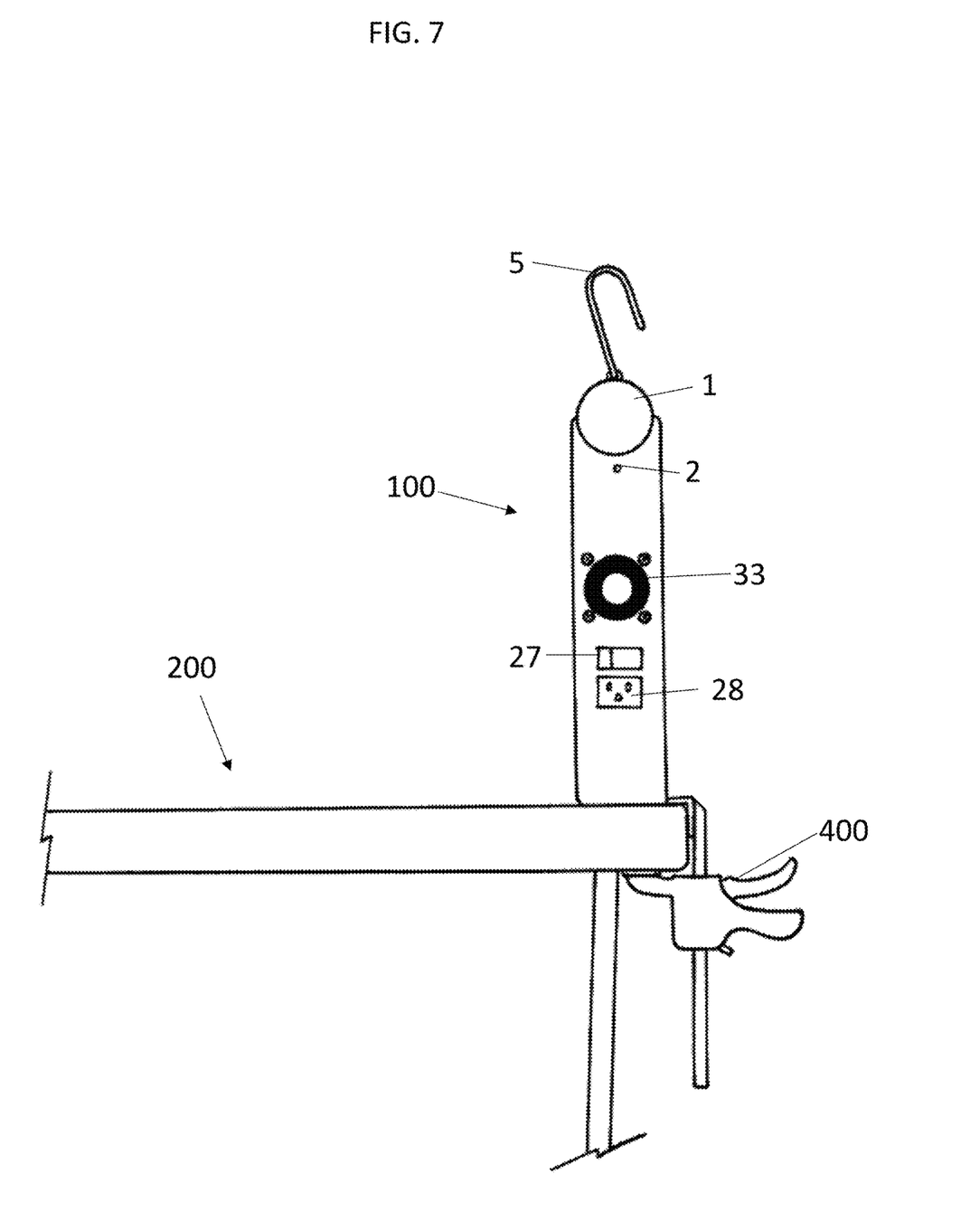
FIG. 7 is a side elevational view of the portable wind and sun screen, according to an embodiment of the present invention.

In an embodiment, as shown in FIGS. 4 and 7, tab 2 is provided on the side of the base to engage the hooks 5 and secure the screen case 1 to the base 100 (as shown in FIGS. 5-6). In an embodiment, as shown in FIGS. 4-5, the base is further provided with a bottle opener 31. Furthermore, the base is provided with air vent 32 to provide ventilation to the electrical components residing within the base.

In an embodiment, as shown in FIGS. 5-6, a solar panel array 35 is provided on the rear of the base 100 to recharge the internal power source. In an exemplary embodiment, the solar panel array 35 is connected to the internal battery. In another embodiment, the solar panel array 35 may be connected to internal power inverter, in communication with the internal battery.

In an embodiment, as shown in FIGS. 6 and 7, a fan 33 is provided to cool the inverter within the base 100. The base is also provided with an inverter charge switch 27 to activate the accessories integrated with the base. Furthermore, a charging cable receptacle 28 is provided to charge the internal power source. In an example embodiment, the inverter provided is a 1500-watt inverter with universal serial bus (usb) charging.

Figure 8:
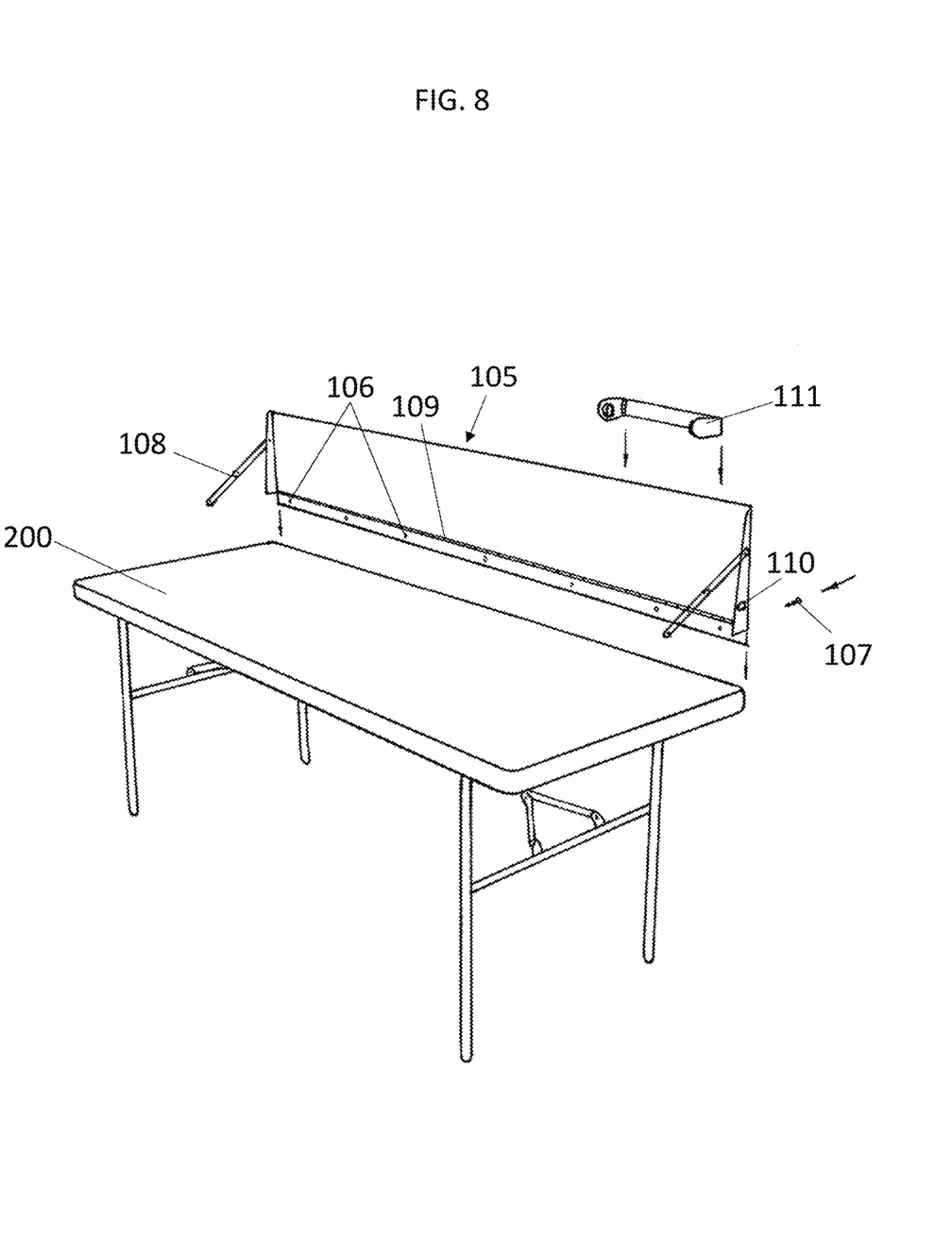
FIG. 8 is a perspective view of the portable wind and sun screen, according to an embodiment of the present invention.
Figure 9:
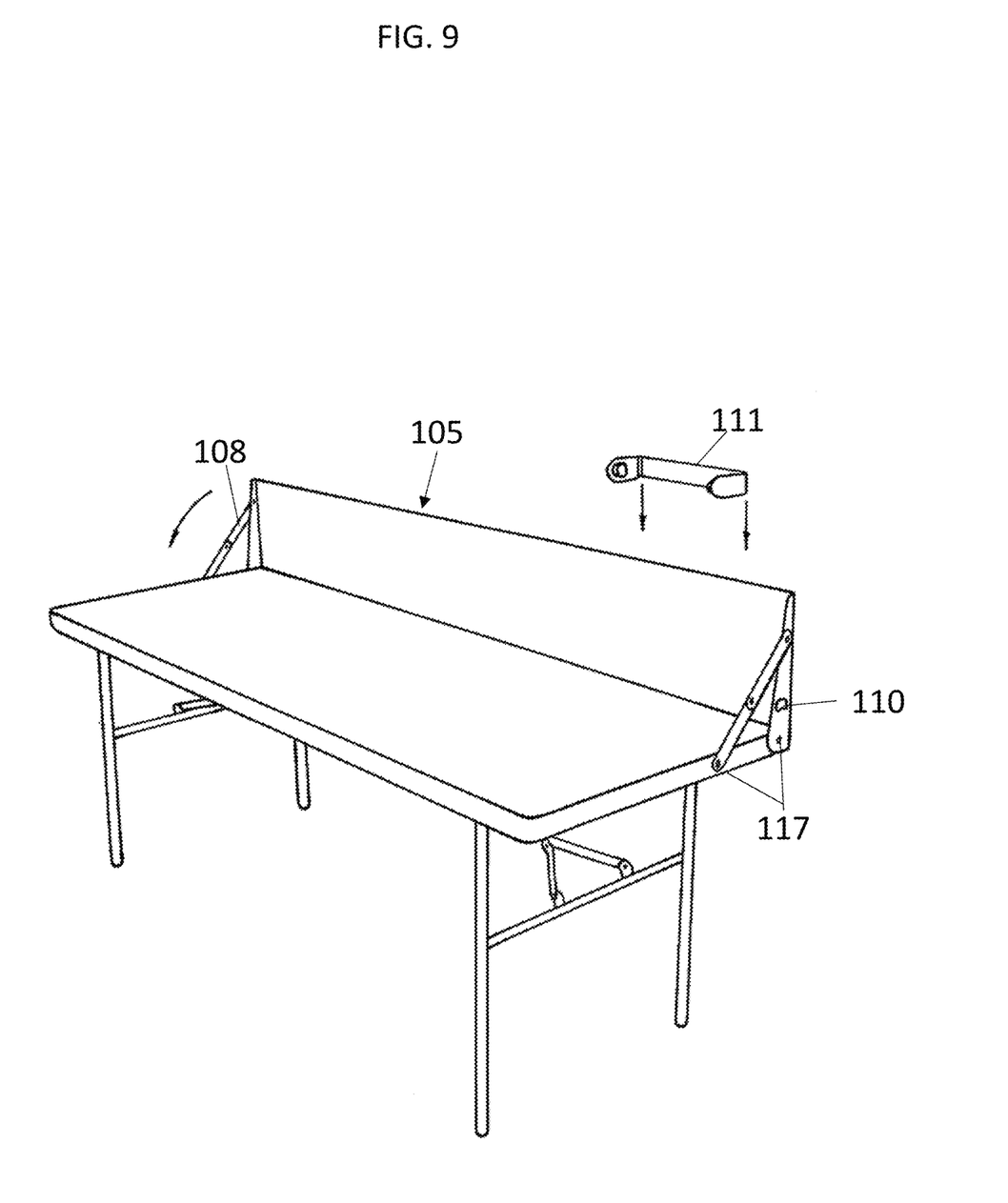
FIG. 9 is a perspective view of the portable wind and sun screen, according to an embodiment of the present invention.

In reference to FIG. 8, an embodiment of the present invention is shown as a wind block 105. The wind block 105 is provided with apertures 106 to receive screws 107 to secure the wind block to an existing table 200. In the embodiment, the wind block is further provided with locking arms 108 and hinge 109 which allow the wind block to be configured in a vertical position, to block wind, or a horizontal position to be folded against the table. In the embodiment, the wind block is further provided a bottle opener 110 and clip on paper towel holder 111. In reference to FIG. 9, an embodiment of the present invention is shown as a table 200, with wind block 105 permanently attached to the table. In an example embodiment, the wind block 105 is fixed to the table via rivets 117.

Figure 10:
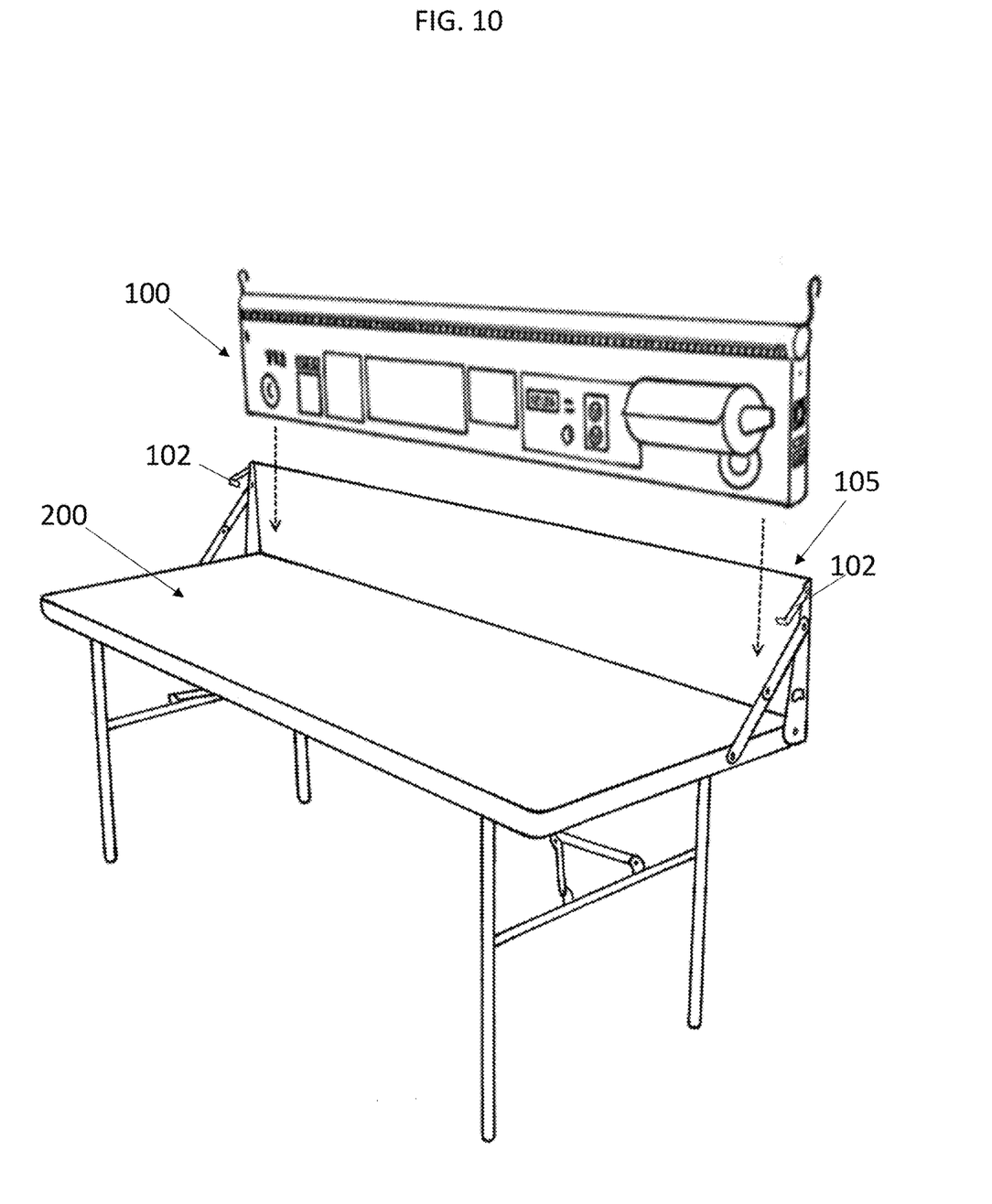
FIG. 10 is a perspective view of the portable wind and sun screen, according to an embodiment of the present invention.

In reference to FIG. 10, an embodiment of the present invention wherein wind block 105 is provided with tabs 102, such that the wind block 105 is configured to receive and hold the base 100 of the portable wind and shade screen.

Figure 11:
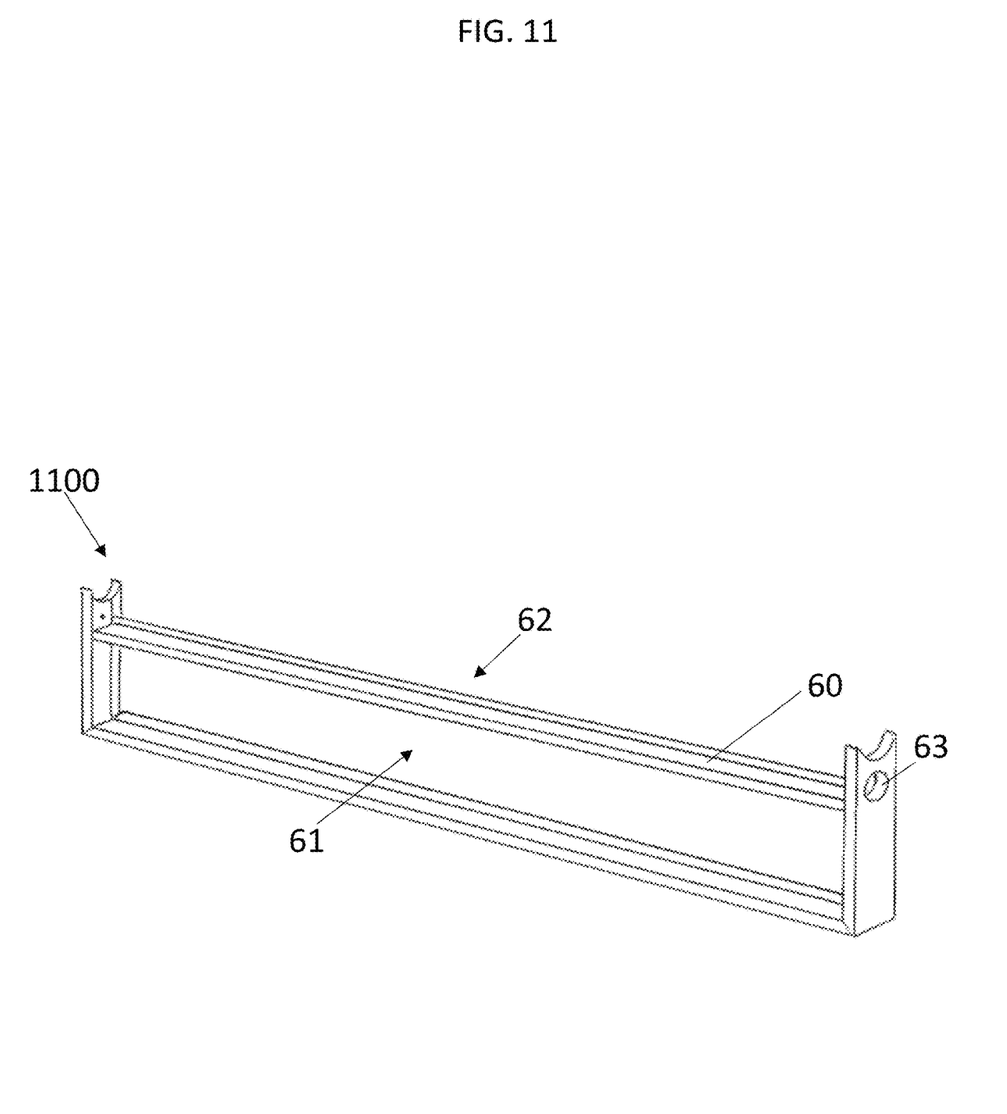
FIG. 11 is a perspective view of the internal frame component of the portable wind and sun screen, according to an embodiment of the present invention.

According to an embodiment, in reference to FIG. 11, the internal frame 1100 of the base is shown. In the embodiment, partition 60 seperates the lower section 61 from the upper section 62. In the embodiment, the lower section 61 provides a volume to house the accessories of the portable wind and sun screen. Upper section 62 provides a volume to house a screen roller. In an embodiment, the partition 60 provides protection, for a screen wound around a screen roller, from heat or movement that may be generated from the accessories to be housed in the lower section. In an embodiment, a hole 63 is provided to allow a user to access the lower screen adjuster 50 (not shown in FIG. 11).

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A portable screen apparatus comprising:
   a base having a first manually operated screen roller disposed within the base;

a screen case having a second manually operated screen roller disposed within the screen case, and including one or more hooks configured for hanging the screen case and the screen apparatus from a separate structure, the separate structure physically separate from any part of the screen apparatus, wherein when the screen case is in an extended state, the screen case is supported only by the separate structure;

a screen extendable from, connected to and disposed about the first screen roller at a first screen end, the screen being connected to and disposed about the second screen roller at a second screen end, the screen includes a transparent portion and an opaque portion, wherein the transparent portion and the opaque portion are configured to be adjusted for full exposure of the opaque portion, full exposure of the transparent portion or exposure of both the opaque portion and the transparent portion, wherein the screen has a first edge and a second edge extending from the first end and the second end of the screen, the first edge and the second edge unattached and unconstrained by any structure between the base and the screen case the screen is extended from either or both of the first screen roller and the second screen roller;

wherein the base has sufficient mass to anchor the screen and the base includes a power input socket electrically connected within the base to a battery and an inverter and electrically connected to a direct charging socket accessible outside the base; and;

one or more clamps, detachably secured to the base, configured to secure the base to a table.

2. The screen apparatus of claim 1, wherein the structure is a canopy.

3. The screen apparatus of claim 1, wherein the base is further provided with one or more accessories selected from the group consisting of a fuse panel, two or more speakers, a light, a paper towel holder, one or more alternating current receptacles, a cigarette lighter, a clock, one or more direct current charging ports, a battery gauge, a bottle opener, and a combination thereof.

4. The screen apparatus of claim 1, wherein a first tension adjuster is provided for the first screen roller, and a second tension adjuster is provided for the second screen roller.

5. The screen apparatus of claim 1, wherein the base is further provided with one or more compartments.

6. The screen apparatus of claim 1, wherein the base is further provided with a cooling fan.

7. A portable screen apparatus comprising:
a base having a first manually operated screen roller disposed within the base;
a screen case having a second manually operated screen roller disposed within the screen case, and including one or more hooks configured for hanging the screen case and the screen apparatus from a separate structure, the separate structure physically separate from any part of the screen apparatus;
the base including a power inverter and a battery compartment electrically coupled to the power inverter and an alternating current receptacle electrically coupled to the power inverter and a charging outlet electrically coupled to the power inverter, the charging outlet accessible externally from the base;
a screen extendable from, connected to and disposed about the first screen roller at a first screen end, the screen being connected to and disposed about the second screen roller at a second screen end, the screen includes a transparent portion and an opaque portion, wherein the transparent portion and the opaque portion are configured to be adjusted for full exposure of the opaque portion, full exposure of the transparent portion or exposure of both the opaque portion and the transparent portion, wherein the screen has a first edge and a second edge extending from the first end and the second end of the screen, the first edge and the second edge unattached and unconstrained by any structure between the base and the screen case when the screen is extended from either or both of the first screen roller and the second screen roller;
wherein when the screen case is in an extended state, the screen case is supported only by the separate structure;
wherein the base has sufficient mass to anchor the screen; and;
one or more fastening devices, detachably secured to the base, configured to secure the base to a table.

8. The screen apparatus of claim 7, wherein the one or more fastening devices are one or more clamps.

9. The screen apparatus of claim 7, wherein the one or more fastening devices are one or more tabs.

10. The screen system of claim 7, wherein the structure is a canopy.

11. The screen system of claim 7, wherein the base is further provided with a solar panel array, and wherein the solar panel array is connected to the power inverter.

12. The screen system of claim 7, wherein the base is further provided with one or more accessories selected from the group consisting of: two or more speakers, a light, a paper towel holder, a cigarette lighter, a clock, one or more direct current charging ports, a battery gauge, and a combination thereof.

13. The screen system of claim 7, wherein a first tension adjuster is provided for the first screen roller, and a second tension adjuster is provided for the second screen roller.

14. The screen system of claim 7, wherein the base is further provided with one or more compartments.

* * * * *